Jan. 10, 1956   J. M. CHAMBERS   2,730,030
STEERABLE AGRICULTURAL IMPLEMENT
Filed June 7, 1953   3 Sheets-Sheet 3

INVENTOR.
JOHN MALET CHAMBERS
BY
Carlson, Pitzner, Hubbard & Wolfe
ATTORNEYS.

United States Patent Office

2,730,030
Patented Jan. 10, 1956

2,730,030

STEERABLE AGRICULTURAL IMPLEMENT

John M. Chambers, Blackdown Hill, Leamington Spa, England, assignor to Massey-Harris-Ferguson (Sales) Limited, a British company Application July 7, 1953, Serial No. 366,594

Claims priority, application Great Britain July 8, 1952

10 Claims. (Cl. 97—47.55)

The invention relates to agricultural implements of the type adapted to be attached to a tractor by a three element hitch linkage such as that shown in the Ferguson Patent No. 2,223,002, issued November 26, 1940, which permits the implement to swing laterally relative to the tractor, and it is more particularly concerned with rear mounted tractor drawn implements designed for row crop cultivation and comparable work.

One object of the invention is to provide means whereby an operator can steer the implement from side to side to follow any variations in straightness of a row of plants or to maintain it in proper relation to the row when working on a side hill, which steering means embodies novel features of construction that materially reduce the labor involved in steering and eliminate objectionable reactions on the steering of the tractor.

Another object is to provide implement steering means wherein the force required to displace the implement to one side or the other of the tractor is derived in large part from the forward motion of the tractor-implement combination.

A more specific object is to provide means whereby the steering of the implement is effected by angling of the implement relative to the tractor to produce a soil reaction on a ground engaging element forming a part of the implement, thus avoiding interference with the steering of the tractor.

It is also an object of the invention to provide improved means for counterbalancing the overhanging weight of the implement and the operator riding thereon to enable it to effectively operate the automatic depth control mechanism of the tractor despite the shallow draft of the implement.

Other objects and advantages of the invention will become apparent from the following detailed description of the preferred embodiment illustrated in the accompanying drawings in which.

While the invention is susceptible of various modifications and alternative constructions, a preferred form has been shown by way of illustration. It is to be understood, however, that the invention is not limited to the specific form shown, nor to use with the particular implement and tractor with which it has been illustrated. It is my intention to cover all modifications and adaptations falling within the spirit and scope of the invention as expressed in the appended claims.

Figure 1:
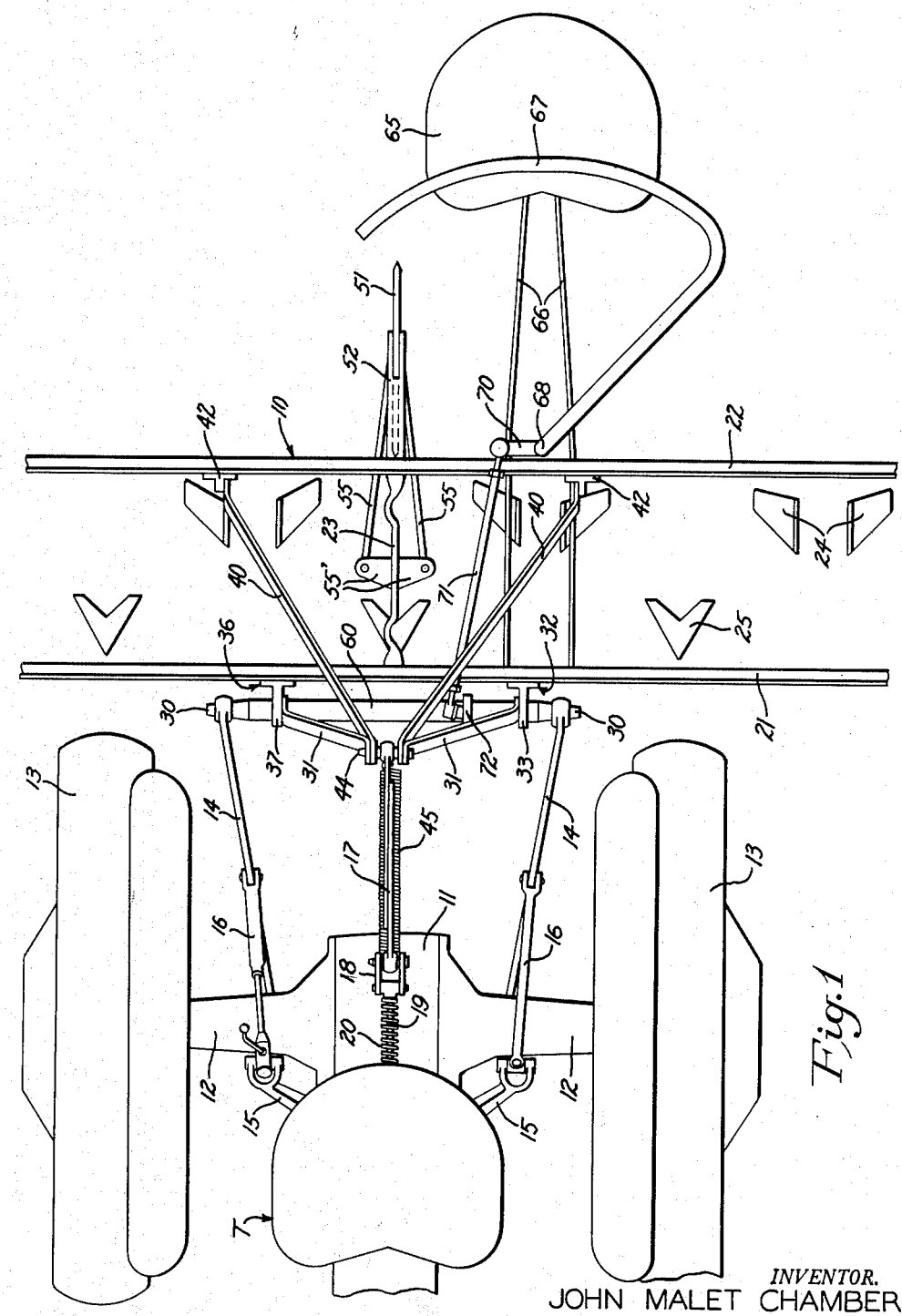
Figure 1 is a diagrammatic plan view of an implement embodying the features of the invention, the implement being shown as attached to a conventional Ferguson tractor.

For purposes of illustration, the invention has been shown as incorporated in a rear mounted row crop cultivator 10 adapted for attachment to the hitch linkage of a Ferguson tractor T. As shown in Fig. 1 of the drawings, the tractor has a body 11 including oppositely projecting axle housings 12 adjacent its rear end supporting the rear drive wheels 13. The hitch linkage provided on this tractor comprises a pair of trailing lower or draft links 14 spaced apart laterally and pivoted at their forward end on the tractor body for universal swinging movement. The draft links are adapted to be raised and lowered by a power unit on the tractor acting through a pair of crank arms 15 connected with the draft links by drop links 16.

Also forming a part of the hitch linkage is an upper or control link 17 adapted to control the power unit on the tractor in well known manner to maintain the implement attached to the linkage at a uniform working depth. As shown, the control link is universally pivoted at its forward end to a rocker member or shackle 18 pivoted on the tractor body. The shackle is operatively connected to the power unit controls through the medium of a control plunger 19 biased by a control spring 20.

As is customary with hitch linkages of the type above described, the draft links 14 converge forwardly so that their axes, if extended, would intersect at or near the center of the tractor's front axle. This arrangement assists in maintaining the implement centered behind the tractor and enables it to respond properly to changes in the direction of movement of the tractor.

Figure 2:
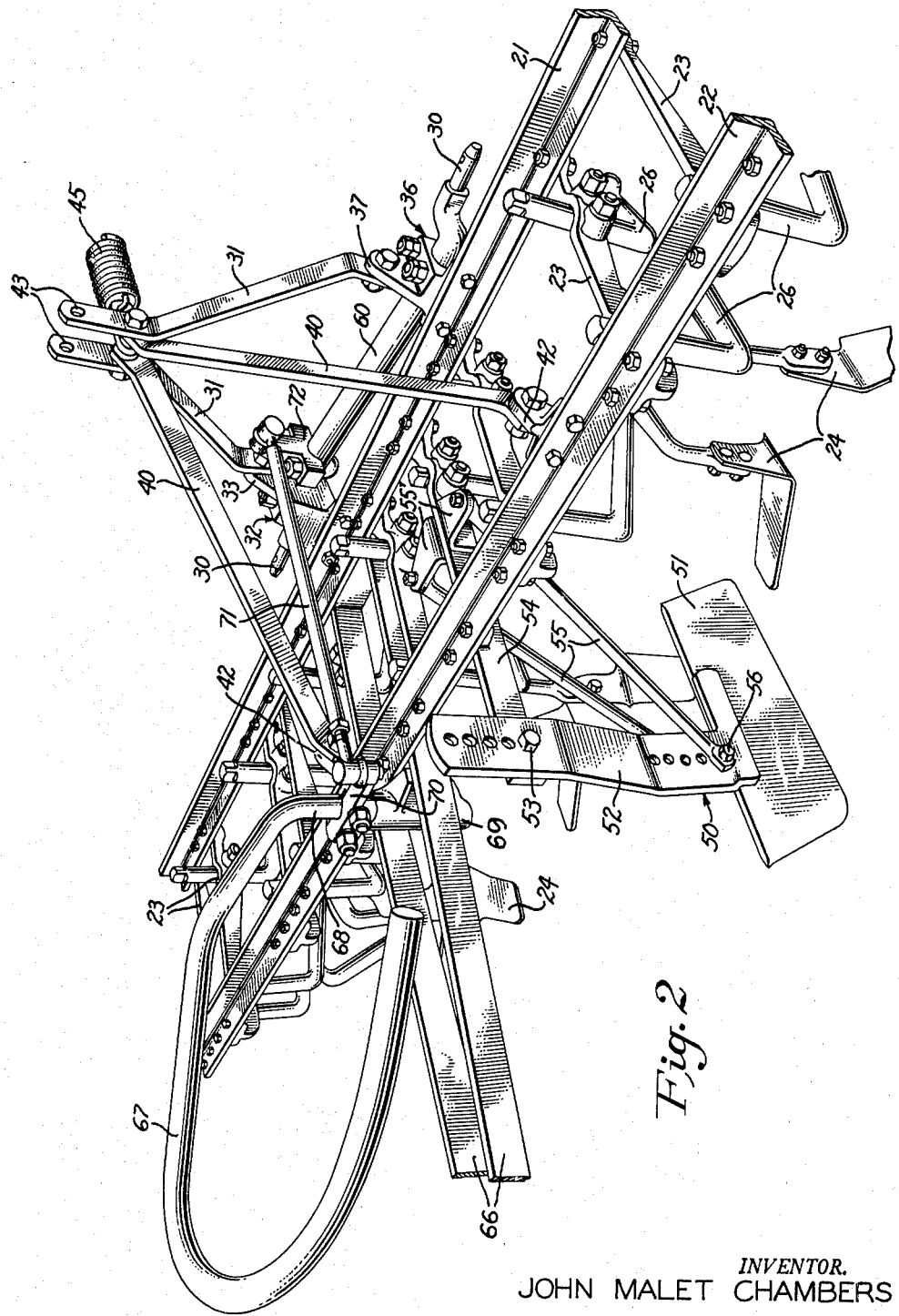
Fig. 2 is a perspective view of the implement looking from the side and rear.

The exemplary implement 10 is a cultivator or hoe of well known construction. It comprises a generally rectangular frame made up of front and rear transverse members 21 and 22, herein shown as angle bars, connected by a plurality of fore and aft bars 23 (Fig. 2). The latter bars carry the tool assemblies of the implement which may be of any preferred character. The tool assemblies shown include side shovels 24 which are commonly arranged in pairs and spaced apart to straddle a plant row, and intermediate shovels 25 disposed between adjacent pairs of side shovels. Each of the shovels is secured for angular adjustment to the horizontally disposed arm of a crank shaped supporting member 26 which has a vertically disposed arm bolted or otherwise adjustably secured to one of the frame members 23.

Provision is made for attachment of the implement to the tractor hitch linkage at three triangularly spaced points. Thus, adjacent the forward end of the implement there are two outwardly facing pins 30 adapted to be inserted through the universally socketed ball connectors conventionally provided at the trailing ends of the draft links 14. The mounting of the pins on the implement constitutes an important feature of the steering mechanism to be described hereinafter.

For attachment of the upper hitch link 17, the implement has an upstanding A-frame structure comprising a pair of side bars 31 attached at their lower ends to the implement frame adjacent its front edge and having their intermediate portions angled inwardly and upwardly to locate their upper ends in spaced parallel relation. In the present instance, one of the side bars 31 is attached to the implement frame by a bracket 32 which has a vertical web 33 to which the bar is secured by a bolt 34. A second vertical web 35 integral with the web 33 and disposed at right angles thereto is bolted or otherwise rigidly attached to the vertical flange of the front frame member 21.

The other side member 31 is attached to the implement frame by a bracket 36 bolted to the vertical flange of the frame member 21 in laterally spaced relation to the bracket 32. Bracket 36 has a vertical web 37 to which the lower end of the bar is bolted or otherwise attached.

Figure 3:
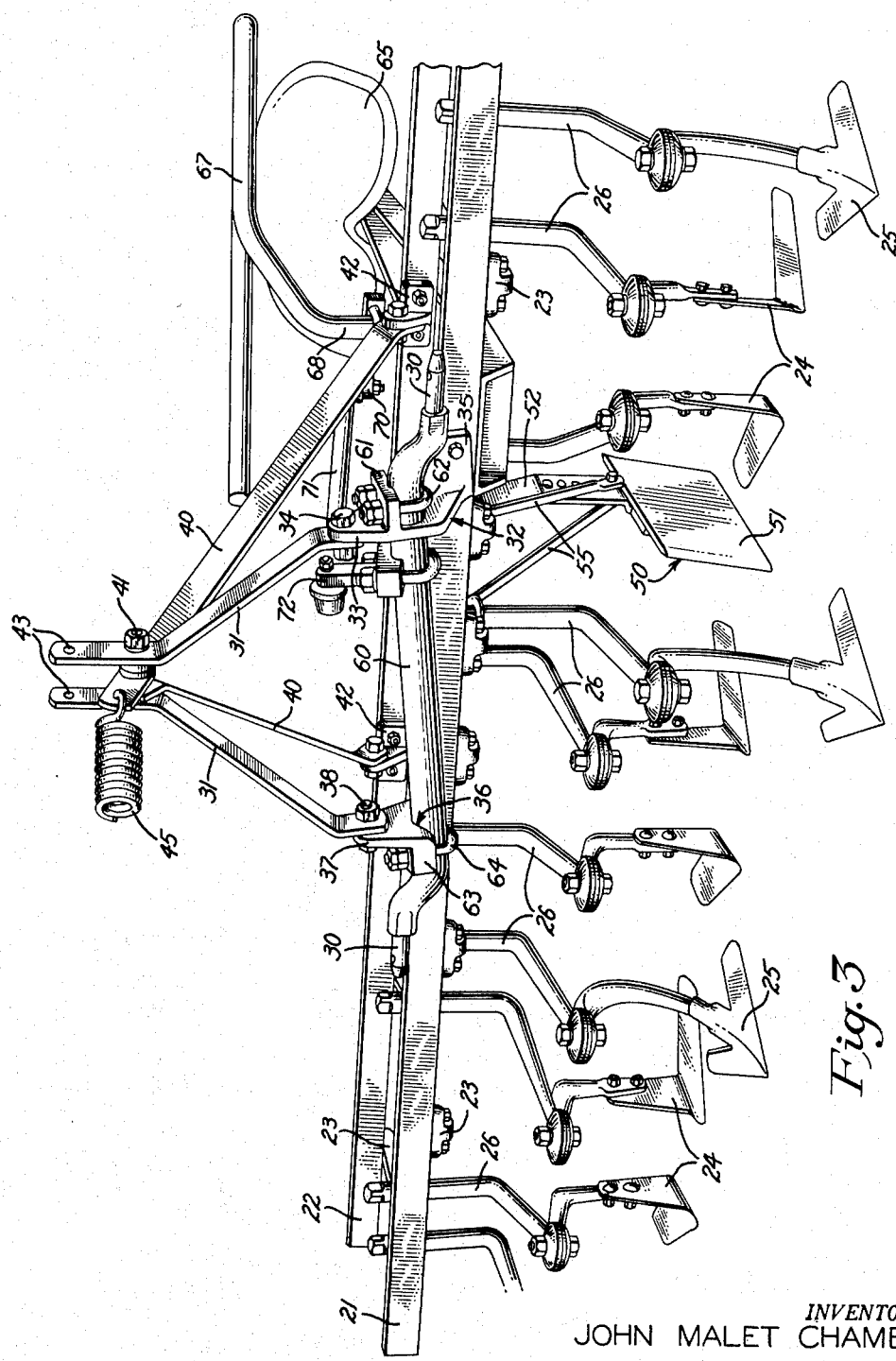
Fig. 3 is a front perspective view of the implement.

The two side bars 31 of the A-frame are held rigidly in upright position by a pair of brace bars 40 which are secured to the side bars adjacent their upper ends by a bolt 41. The brace bars extend diagonally rearwardly from the A-frame for connection with the rear frame member 22. As shown in Figs. 2 and 3, the brace bars are bolted to brackets 42 which, in turn, are bolted or otherwise rigidly secured to the vertical flange of the rear frame member 22.

At their upper ends, the side bars 31 of the A-frame are formed with apertures 43 for the reception of an attaching pin 44 (Fig. 1) which serves to connect the upper hitch link to the implement. The top link is thus enabled to resist the tendency of the implement to rock forwardly about its connections with the draft links through the soil reaction on the tool assemblies. Accordingly, a compression force proportioned to the soil reaction is transmitted to the spring biased control plunger 19 of the tractor which acts in well known manner to cause the power unit of the tractor to raise or lower the hitch linkage and attached implement so as to maintain a substantially uniform draft load on the linkage.

Implements of the type under consideration when used for row crop cultivation usually have a riding operator for steering the implement along the plant rows. The operator conventionally sits well back of the implement frame so that a good view of the plant rows may be obtained. The operator's weight and the implement weight thus overhang at the rear of the connection with the hitch linkage and must be overcome by soil reactions on the tool assemblies before the implement can exert a compressive controlling force on the top link. When cultivating at very shallow depths, the soil reaction alone may be insufficient to accomplish that result.

In accordance with one aspect of the invention provision is made for counterbalancing the weight of the implement and operator so that a smaller proportion of the soil reaction forces are required for that purpose, thereby releasing more of such forces for operation of the tractor controls. For this purpose, a coiled tension spring 45 is anchored at one end to the A-frame structure of the implement, preferably through the medium of the bolt 41. The other end of the spring is suitably anchored to the tractor body, as for example to the coupling pin provided on the Ferguson tractor. This locates the spring below and substantially parallel to the upper link. When thus connected, the spring exerts a force on the implement tending to rock it forwardly and by selecting a properly related spring, the overhanging weight of the implement and operator can be substantially counterbalanced. Substantially all of the soil reaction forces are therefore available for control which is highly advantageous in light draft implements.

As the hitch links are universally pivoted on the tractor in forwardly converging relation and further, since the implement is universally coupled to the links, it will be evident that the implement will normally tend to follow in a straight line directly behind the tractor when operated on level ground. When operated on a hillside, however, the implement will tend to slip down hill. For row crop cultivation it is therefore desirable to provide some means for steering the implement, preferably by an operator riding on the implement in a position to have a good view of the ground-working tools and the plant row adjacent which they are working.

The present invention provides novel steering means whereby the operator may cause the implement to follow the plant rows very closely either on level ground or on hillsides regardless of whether the rows are straight or vary considerably in straightness. In accordance with the invention, steering of the implement is carried out in two steps of which only the first involves manual effort and only a comparatively small amount of that on the part of the operator. Actually, so little effort is required that a child can easily guide the implement. Thus the first step in the steering operation involves a slight swinging of the implement about a grounded fulcrum provided, in this instance, by an implement carried ground engaging element 50, to adjust its angular position with respect to the tractor. Thereafter, as the implement is pulled forwardly, the ground engaging structure serves as a rudder to guide the implement toward one side or the other of the tractor until the equilibrium of the hitch linkage is restored and the implement again assumes its normal perpendicular relation to the center line of the tractor. Thus, the major force required to steer the implement is derived from the forward motion of the tractor and implement and the operator is relieved of much of the work involved in steering with mechanisms heretofore provided on comparable implements.

In the exemplary embodiment of the invention, the ground engaging structure 50 comprises a generally rectangular blade or fin 51 presenting relatively large reaction surfaces facing laterally, that is, transversely of the intended path of movement of the implement. While the fin 51 may be of the resilient, unbalanced type such as that disclosed in the Ferguson Patent No. 2,195,516, it is preferred to employ a rigid, balanced type fin and to incorporate the resiliency required for obtaining the desired steering effect in the structure supporting the fin on the implement. Accordingly, the fin 51 shown comprises a relatively rigid metal plate with its leading and trailing edges suitably sharpened to facilitate penetration of the soil.

As best shown in Fig. 2 of the drawings, the fin 51 is carried at the lower end of a vertically disposed stem 52 secured as by a bolt 53 to a rearward extension 54 of one of the frame bars 23, preferably the one nearest the center of the implement frame. Additionally, one end of the stem may be off-set slightly with respect to the other end to locate the fin precisely at the center line of the implement.

The stem is reinforced against lateral bending or displacement by a pair of converging stay bars 55 anchored to a bracket 55' attached to the center frame member 23 and extending downwardly therefrom at opposite sides of the fin. At their lower ends, the stay bars are secured to the stem by a bolt 56 in a manner permitting torsional bending or twisting of the stem. This effect may be obtained by fitting the bolt loosely in the aperture provided in the stem for its reception or by interposing a suitable spacer between the connected parts. In either case, the torsional resilience of the stem enables the fin 51 to exert an automatic self-centering effect as explained in the above mentioned Ferguson patent. As herein shown, the stem 52 is formed with a plurality of apertures for the accommodation of both bolts 53 and 56, the apertures being spaced apart longitudinally of the stem to provide for adjustment of the running depth of the fin.

To provide for changing the angle of the implement relative to the tractor, the coupling pins 30 are mounted on the implement frame so that at least one of them and preferably both may be shifted relative to the frame in a fore and aft direction. As herein shown, the pins are mounted in opposite ends of a shaft 60 eccentrically of the longitudinal axis of the shaft, the eccentricity of the pins being oppositely directed. In what may be termed the normal position of the shaft, the pins 30 lie in a common vertical plane and the implement frame is disposed substantially perpendicular to the center line of the tractor. As the shaft is rocked from the normal position, one pin moves forwardly and the other rearwardly and consequently alters the angular relation of the implement frame with respect to the tractor center line.

The shaft 60 is rotatably supported in the present instance on the brackets 32 and 36. For this purpose, the vertical web 33 of the bracket 32 is formed with an opening to receive this shaft, such opening being located immediately below a horizontal web 61 integral with and projecting laterally from the vertical web. The horizontal web 61 is formed on its underside with a curved recess or seat for the shaft and is apertured to receive the legs of a U-bolt 62 which serves to hold the shaft in its seat and which engages in a groove in the shaft to hold it against endwise movement.

The companion bracket 36 which supports the other end of the shaft 60 has a horizontal web 63 formed on its underside to provide a seat for the shaft and apertured to receive the legs of a U-bolt 64 adapted to hold the shaft in its seat. It will be understood that the U-bolts 62 and 64 are not drawn up tightly enough to prevent rotation of the shaft.

Provision is made whereby an operator riding on the implement may rock the shaft 60 and thus steer the implement. To provide the operator with a good view of the plant rows under cultivation, the implement is equipped with a seat 65 conveniently located rearwardly of the implement frame. As herein shown, the seat is carried by a pair of beams 66 bolted or otherwise rigidly attached to the transverse frame members 21 and 22.

Steering is effected through the medium of a tiller having a curved handle portion 67 conveniently located for manipulation by the operator while occupying the seat 65. The handle portion of the tiller terminates in a generally vertical shank portion 68 rotatably received in bearing provided by a bracket 69 bolted to the rear frame member 22. A radially projecting crank arm 70 rigidly clamped to the shank portion of the tiller and connected by a link 71 with a crank arm 72 rigidly clamped to the shaft 60 rocks the shaft in response to the swinging of the tiller.

In operation, the implement follows directly behind the tractor when the shaft 60 is in normal position. If the tiller is swung to the left of the operator occupying the seat 65, the shaft 60 is rocked rearwardly and, due to the eccentricity of the pins 30, the effective length of the left-hand link is increased while that of the right-hand link is decreased and the implement is pivoted toword the operator's left about a vertical axis located at or near the center of the shaft. As the fin 51 is spaced from the shaft, in this instance, to the rear of such vertical axis, it would swing to the right if it were not prevented from moving by the resistance of the soil. However, the fin when engaged in the soil acts as the fulcrum of a lever extending to the above mentioned vertical axis and effective by reason of the soil reaction on the fin to swing the implement and the tractor hitch links to the operator's left from their normal trailing position. In this movement, the stem 52 is twisted about its vertical axis as previously explained. This action is not dependent upon forward movement of the implement and tractor and may be regarded as a primary steering effect produced by force supplied by the operator. It will be understood, of course, that the steering action ordinarily takes place while the implement is in motion, which materially reduces the effort required on the part of the operator to move the shovels 25 through the soil.

As the tractor and implement move forwardly with the implement angled, the torsional stress on the stem 52 causes the fin to act in rudder fashion to deflect the implement to the operator's left until equilibrium is reached, that is, until the torsional stress on the support is neutralized and the fin approaches a straight ahead position, that is, parallel relation to the path of movement of the tractor. It will be appreciated, of course, that the converging arrangement of the draft links 14 which is characteristic of the hitch linkage of the Ferguson tractor tends to bring the fin to the straight ahead position. This may be regarded as a secondary steering effect which is power actuated since the force required to produce it is derived largely from the forward motion of the tractor and implement.

The dual action of the improved steering mechanism provided by the invention is highly advantageous. The primary steering effect permits quick action in steering the implement along a crooked row independently of the speed of forward travel of the tractor and implement. The secondary steering effect being power operated, cuts down the effort that must be exerted by the operator and materially reduces operator fatigue, particularly when working on a hillside. Moreover, since the steering force is derived from soil reactions on the fin, a minimum of lateral thrust is imposed on the tractor tending to force its rear end downhill.

In general, therefore, it will be apparent that the invention provides steering mechanism of novel and advantageous construction particularly well suited for row crop cultivators and comparable agricultural implements. The improved mechanism enables the operator to steer the implement from side to side to follow any variations in the straightness of a row of plants under cultivation. Cultivation may therefore be carried on quite close to the row without danger of damaging the crop plants. Moreover, the implement may be easily guided in a proper course when working on a hillside without unduly fatiguing the operator and without producing any undesirable reaction on tractor steering.

The invention also provides simple yet effective means for counterbalancing the overhanging weight of the implement and the operator riding thereon. Soil reaction forces on the ground working tool assemblies are thus made available in large part for operation of the automatic draft control mechanism on the tractor. The controls as thus enabled to function effectively even when the implement is set for very shallow cultivation.

I claim as my invention:

1. For use with a tractor having a pair of laterally spaced draft links and a control link spaced upwardly therefrom all pivotally attached to the tractor for universal swinging movement, an implement comprising, in combination, a frame, connecting means on said frame cooperating with the trailing ends of the links to connect the implement thereto for movement with the tractor and for lateral swinging movement relative thereto, means for adjusting at least one of the connecting means cooperating with the draft links in a fore and aft direction to vary the angular disposition of said frame with respect to the center line of the tractor, and ground engaging means on said frame operative to swing the frame and draft links to one side or the other of the tractor center line a sufficient distance to position the frame at right angles to the tractor center line.

2. For use with a tractor having a trailing hitch linkage including a pair of laterally spaced draft links pivoted on the tractor for universal swinging movement, an implement comprising, in combination, a frame carrying ground working tools, connecting elements on said frame engageable with the trailing ends of the links to pivotally connect the implemenet thereto, steering means for said implement including means for adjusting at least one of said connecting elements in a fore and aft direction relative to said frame to vary the angular relation of the frame with respect to the center line of the tractor in either direction from a position perpendicular to such center line, and a ground engaging member on said frame operative through soil reaction in the forward movement of the tractor and implement to deflect the implement toward one side or the other of the tractor to restore the implement frame to a position substantially perpendicular to the tractor center line.

3. For use with a tractor having a trailing hitch linkage including a pair of laterally spaced draft links pivoted on the tractor for universal swinging movement, an implement comprising, in combination, a frame carrying ground working tools, connecting elements on said frame engageable with the trailing ends of the links to pivotally connect the implement thereto, steering means for said implement including means operable to simultaneously shift said elements in opposite directions fore and aft of said frame to vary the angular position of the frame with respect to the center line of the tractor in either direction from a position perpendicular to such center line, and a ground engaging member on said frame operative in response to soil reaction in the forward movement of the tractor and implement to displace the implement laterally of the tractor in a direction to locate the implement frame substantially perpendicular to the tractor center line.

4. A tractor drawn implement as defined in claim 1 in which the ground engaging member comprises a fin shaped to present a relatively large reaction area facing laterally of the implement.

5. A tractor drawn implement as defined in claim 2 in which the ground engaging member is in the form of a blade mounted to extend fore and aft of the frame and located substantially to the rear of the connections between the implement frame and the draft links.

6. A tractor drawn implement as defined in claim 3 in which the shifting of the connecting elements is effected by a member actuated by an operator riding on the implement.

7. A tractor drawn implement as defined in claim 3 in which the connecting elements are in the form of pins eccentrically mounted at opposite ends of a bar supported on the frame and in which the shifting of the elements is effected by rocking the bar about its longitudinal axis.

8. For use with a tractor having a trailing hitch linkage including a pair of laterally spaced draft links pivoted on the tractor for universal swinging movement and having universally socketed balls at their trailing ends, an implement comprising, in combination, a frame including transverse front and rear members connected by fore and aft members, adjustable connecting means for coupling the implement to the draft links comprising a bar rotatably supported on said front frame member and disposed generally parallel thereto, pins projecting from opposite ends of said bar for engagement in apertures in the balls at the ends of the draft links, a crank fixed to said bar, a tiller supported on said rear frame member for pivotal movement on a vertical axis, a linkage connecting said tiller with said crank operative to rock said bar when the tiller is swung about its pivot, the rocking of said bar acting to vary the angular relationship between the implement frame and the center line of the tractor, and a ground engaging fin on said frame operative when said angular relationship is other than perpendicular to deflect the implement toward that side of the tractor required to restore the perpendicular relationship.

9. For use with a tractor having a trailing hitch linkage including a pair of laterally spaced draft links pivoted on the tractor for universal swinging movement, an implement adapted to be coupled to the trailing ends of said links for movement with the tractor and laterally relative to the tractor, means for steering said implement while keeping the tractor free of lateral reaction affecting its steering comprising means for varying the angular relationship of the implement relative to the tractor, and a ground engaging member subject to soil reaction determined by such angular relationship and operative to deflect the implement to one side or the other of the tractor.

10. For use with a tractor having a trailing hitch linkage including a pair of laterally spaced draft links pivoted on the tractor for universal swinging movement, an implement having means for connecting it to the trailing ends of the draft links so as to normally follow directly behind the tractor in its forward movement, means for steering said implement to either side of the tractor comprising means for adjusting the connecting means so as to vary the angular relationship between the tractor and the implement, and a ground engaging member operative to apply a laterally directed steering force to the implement when the angular relationship is changed from a predetermined value.

References Cited in the file of this patent

UNITED STATES PATENTS

| | | |
|---|---|---|
| 1,472,888 | Rose | Nov. 6, 1923 |
| 1,916,945 | Ferguson | July 4, 1933 |
| 2,195,516 | Ferguson | Apr. 2, 1940 |
| 2,460,847 | Schwarz | Feb. 8, 1949 |
| 2,604,835 | Sands et al. | July 29, 1952 |